… … …

United States Patent Office 3,702,250
Patented Nov. 7, 1972

3,702,250
DIAZO COATING SOLUTIONS
Walker F. Hunter, Hilton, and John M. McCabe, Pittsford, N.Y., assignors to Eastman Kodak Company, Rochester, N.Y.
No Drawing. Continuation-in-part of abandoned application Ser. No. 679,234, Oct. 30, 1967. This application May 4, 1970, Ser. No. 34,540
Int. Cl. C23f 11/04, 11/08; G03c 1/60
U.S. Cl. 96—91 R   7 Claims

ABSTRACT OF THE DISCLOSURE

The corrosive effect that diazo salt solutions exhibit on metallic surfaces is found to be substantially retarded by the incorporation of small amounts of propylene oxide and/or nitrite ions in the diazo solutions.

---

This application is a continuation-in-part of copending U.S. application Ser. No. 679,234 filed Oct. 30, 1967, now abandoned.

This invention relates to diazonium salt solutions. In one aspect this invention relates to diazonium salt solutions which have significantly decreased tendency to cause corrosion of metal surfaces which they contact.

In the handling of diazonium salt solutions and especially of stabilized diazonium salt solutions which are used for the preparation of diazo photographic materials and the like, frequently it is desirable and often necessary to use metallic containers, conduits and other apparatus for coating, etc. However, when the solutions are brought in contact with metals, a rapid corrosion of the metals takes place. This corrosion severely limits the useful life of the metallic equipment and may introduce undesirable contaminants into the solutions. The search for methods for alleviating this problem has included studies directed toward chemical compounds which suppress the corrosive tendencies of the diazo solutions. Although some success in this respect has been achieved, the extent of the corrosion inhibition has frequently been rather limited. Significant etching of metals and other indications of attack often appear after a few hours of contact between the solutions and metals. New corrosion inhibitors and solutions having decreased corrosion tendencies are, therefore, continually being sought.

One object of this invention is to provide materials which tend to decrease metallic corrosion caused by diazonium salt solutions contacting metal surfaces. A further object is to provide stabilized diazonium salt solutions which have a decreased tendency to corrode metals. A still further object is ot provide methods for the prevention of corrosion of metals which contact diazonium salt solutions.

The above objects and other objects which will be apparent from the description below are accomplished by the incorporation of small amounts of propylene oxide and/or nitrite into diazonium salt solutions.

According to one embodiment of this invention, nitrite is added to solutions of diazo salts. The resultant solutions are markedly less corrosive than are otherwise identical solutions in the absence of nitrite. By nitrite is meant the $NO_2^-$ anion or the moiety or moieties, complexes, etc. resulting from the addition of, especially, metallic nitrites to solutions of diazonium salts. Most often alkali metal nitrites are utilized, especially advantageous of which is sodium nitrite. The nitrite can be added in varying percentages. However, the addition of large quantities of nitrite can increase the degradation of the diazonium solutions, therefore, decreasing the overall advantage of the system. A nitrite concentration of about 0.0005% to about 1.0% by weight $NO_2^-$ based on the total weight of the solution is most often employed with more outstanding results obtained at concentrations of about 0.00067% to about 0.067% by weight.

In another embodiment of the invention propylene oxide is incorporated into solutions of diazonium salts, 1,2-propylene oxide (hereinafter propylene oxide) unexpectedly has been found to suppress the corrosive tendencies of such solutions to a far greater degree than other analogous compounds and corrosion inhibitors especially with respect to stabilized diazonium salt solutions. The propylene oxide is usually added in concentrations varying from about 0.001% to about 1.0% by weight based on the total weight of solution but the ranges may vary more widely. Since an increase in the propylene oxide content also tends to increase the rate of diazonium degradation, it is usually wise to avoid high propylene oxide concentrations. Especially advantageous results are obtained by including the propylene oxide at a concentration ranging from about 0.001% to about 0.20% by weight.

In an especially advantageous embodiment of the invention propylene oxide and nitrite are both included in the solutions of diazonium salts. Such solutions are effective in preventing varying types of metallic corrosion. The propylene oxide and nitrite can be incorporated into the diazonium salt solutions separately or in combination. The propylene oxide and nitrite are advantageously utilized in the concentrations indicated previously for the individual components, i.e., about 0.001% to 1.0% by weight, especially 0.001% to about 0.2% by weight for the propylene oxide and about 0.0005% to 1.0%, especally about 0.00067% to 0.67% by weight nitrite. An extremely effective corrosion inhibition results when about 0.001% to about 0.1% by weight sodium nitrite and about 0.001% to about 0.2% by weight propylene oxide are incorporated in solutions of stabilized diazonium salts.

Typical benzene diazonium salts include those of the formula:

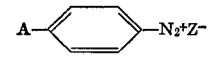

wherein A is either a hydrogen atom, a halogen atom, an aryl radical, an amino radical (including substituted amino radicals), or a substituted mercapto radical, and Z is an anion. These compounds can also be substituted on one or more of the nuclear carbons with at least one of either a halogen atom, an alkyl radical, an alkoxy radical, an acyl radical, a carbamyl radical, a carboxyl radical, or a nitro radical.

Particularly useful compounds within the scope of this invention include benzene diazonium salts having the formula as described above wherein A is either an amino radical including substituted amino radicals or a substituted mercapto radical, and wherein the benzene nucleus is unsubstituted or substituted in at least one of the 2-position and the 5-position with either an alkyl radical or an alkoxy radical. This class of useful diazonium salts can be represented by the formula:

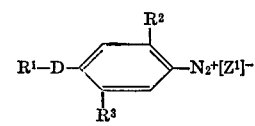

wherein:
(1) D is either a sulfur atom or a radical having the Formula $NR^4$,
(2) $R^1$, when taken alone, is either a hydrogen atom when D is $NR^4$, or a lower alkyl radical, a lower alkoxy radical, a lower acyl radical, an aryl radical having a nucleus of 6 carbon atoms, or an aralkyl radical when D is either a sulfur atom of NR⁴, (3) R⁴, when taken alone, is either a hydrogen atom, a lower alkyl radical, or a lower alkoxy radical, (4) R¹ and R⁴, when taken together, complete a divalent radical having the formula

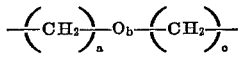

wherein $b$ is an integer having a value of 0 or 1, each of $a$ and $c$ is a positive integer, and the sum of $a$, $b$ and $c$ has a value of up to 5, (5) R² and R³ are each either a hydrogen atom, a lower alkyl radical (preferably methyl or ethyl or a lower alkoxy radical (preferably methoxy or ethoxy), and (6) Z¹ is an anion.

Especially effective benzene diazonium salts are the stabilizer salts which include the substituted amino benzene diazonium salts having the formula:

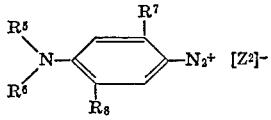

wherein:

(1) Each of R⁵ and R⁶, when taken alone, is a lower alkyl radical, (2) R⁵ and R⁶, when taken together are the number of carbon and hetero oxygen atoms necessary to complete a morpholino radical, (3) Each of R⁷ and R⁸ is either a hydrogen atom, a lower alkyl radical or a lower alkoxy radical, and (4) Z² is either a chlorozincate anion, a fluoroborate anion or a chlorostannate anion.

The most efficacious benzenes diazonium salts are the fluoroborate salts wherein (a) R⁷ and R⁸ are alkoxy radicals when R⁵ and R⁶ complete a morpholino radical, and (b) and R⁷ and R⁸ are each a hydrogen atom when R⁵ and ⁶ are each a lower alkyl radical.

Illustrative of the subject diazonium salts are such compounds as the salts of 1-diazo-2,5-dimethoxybenzene,
1-diazo-2,5-diethoxybenzene,
1-diazo-4-chloro-2,5-diethoxybenzene,
4-diazo-2,5-dimethoxybiphenyl,
4-diazo-2,5,4'-triethoxybiphenyl,
1-diazo-4-dimethylaminobenzene,
1-diazo-4-(diethoxyamino)-benzene,
1-diazo-4-[bis(hydroxypropyl)amino]benzene,
1-diazo-4-(N-methyl-N-allylamino)benzene,
1-diazo-4-(diethylamino)benzene,
1-diazo-4-(diamylamino)-benzene,
1-diazo-4-(oxazolidino)benzene,
1-diazo-4-(cyclohexylamino)-benzene,
1-diazo-4-(9-carbazolyl)benzene,
1-diazo-4-(dihydroxyethylamino)-3-methylbenzene,
1-diazo-4-dimethylamino-3-methylbenzene,
1-diazo-2-methyl-4-(N-methyl-N-hydroxypropylamino) benzene,
1-diazo-4-dimethylamino-3-ethoxybenzene,
1-diazo-4-diethylamino-3-chlorobenzene,
1-diazo-2-carboxy-4-dimethylaminobenzene,
1-diazo-3-(2-hydroxyethoxy)-4-pyrrolidinobenzene,
1-diazo-2,5-diethoxy-4-acetoxyaminobenzene,
1-diazo-4-methylamino-3-ethoxy-6-chlorobenzene,
1-diazo-2,5-dichloro-4-benzylaminobenzene,
1-diazo-4-phenylaminobenzene,
1-diazo-4-morpholinobenzene,
1-diazo-4-morpholino-3-methoxybenzene,
1-diazo-4-morpholino-2,5-dimethoxybenzene,
1-diazo-4-morpholino-2-ethoxy-5-methoxybenzene,
4-diazo-2,5-diethoxy-1-morpholinobenzene,
1-diazo-4-morpholino-2,5-dibutoxybenzene,
1-diazo-2,5-diethoxy-4-benzoylaminobenzene,
1-diazo-2,5-dibutoxy-4-benzoylaminobenzene,
1-diazo-4-ethylmercapto-2,5-diethoxybenzene,
1-diazo-4-tolylmercapto-2,5-diethoxybenzene, and the like.

The couplers which are usually included in the diazo coating solutions in accordance with this invention include those disclosed by Kosar, "Light-Sensitive Systems," John Wiley & Sons, Inc., New York (1965), pp. 220–240. Phenolic couplers are preferred, however, with particularly preferred classes including:

(A) As blue couplers, 2 - hydroxy-3-naphthonanilides having the formula:

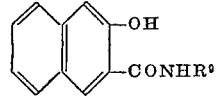

wherein R⁹ is a phenyl radical, and preferably a phenyl radical substituted with at least one of either a lower alkyl radical or a lower alkoxy radical or a halogen atom;

(B) As yellow couplers, 1 - hydroxy-2-naphthamides having the formula:

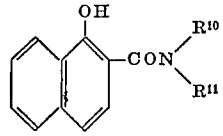

wherein:

(1) Each of R¹⁰ and R¹¹, when taken alone, is either a hydrogen atom or an alkyl radical, a cycloalkyl radical, an aryl radical, an aralkyl radical and the like hydrocarbon or substituted hydrocarbon radicals.

(2) R¹⁰ and R¹¹, when taken together represent the carbon and oxygen atoms necessary to complete a six membered hetero, e.g., piperidino or morpholino radical, and (C) As yellow couplers, 2 - acylamido-5-substituted phenols having the formula:

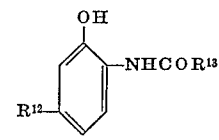

wherein R¹² is either an alkyl radical or an alkoxy radical and R¹³ is either an alkyl radical, an aryl radical, an aralkyl radical or an aralkoxy radical.

Illustrative of the subject couplers are such compounds as for example, 2-hydroxy-3-naphthanilide,
2-hydroxy-2'-methyl-3-naphthanilide,
2-hydroxy-2',4'-dimethoxy-5'-chloro-3-naphthanilide,
2-hydroxy-2'-dimethoxy-3-naphthanilide,
2-hydroxy-2',5'-dimethoxy-4'-chloro-3-naphthanilide,
2-hydroxy-1'-naphthyl-3-naphthanilide,
2-hydroxy-2'-naphthyl-3-naphthanilide,
2-hydroxy-4'-chloro-3-naphthanilide,
2-hydroxy-3-naphthanilide,
2-hydroxy-2',5'-dimethoxy-3-naphthanilide,
2-hydroxy-2',4'-dimethyl-3-naphthanilide,
1-hydroxy-2-naphthamide,
N-methyl-1-hydroxy-2-naphthamide,
N-butyl-1-hydroxy-2-naphthamide,
N-octadecyl-1-hydroxy-2-naphthamide,
N-phenyl-1-hydroxy-2-naphthamide,
N-methyl-N-phenyl-1-hydroxy-2-naphthamide,
M-(2-tetradecyloxyphenyl)-1-hydroxy-2-naphthamide,
N-[4-(2,4-di-tert-amylphenoxy)butyl]-1-hydroxy-2-naphthamide,
1-hydroxy-2-naphthopiperidide,
N-(3,5-dicarboxyphenyl)-N-ethyl-1-hydroxy-2-naphthamide,
N,N-dibenzyl-1-hydroxy-2-naphthamide, N-(2-chlorophenyl)-1-hydroxy-2-naphthamide,
N-(4-methoxyphenyl)-1-hydroxy-2-naphthamide,
1-hydroxy-2-naphthopiperizide,
1,3-bis(1-hydroxy-2-naphthamidobenzene),
2-acetamido-5-methylphenol,
2-acetamido-5-pentadecylphenyl,
2-butyramido-5-methylphenol,
2-(2,4-di-tert-amylphenoxyacetamide)-5-methylphenol,
2-benzamido-5-methylphenol, and the like.

In addition to the couplers employed a sterically hindered phenolic compound is advantageously utilized to act as a fade-inhibtor for the resultant azo dyes according to U.S. application Ser. No. 657,077 entitled Two Component Diazo Type Composition, filed July 31, 1967 by William Gray, now U.S. Pat. 3,573,051 issued Mar. 30, 1971. The fade-inhibiting amount of phenol is subject to wide variation, but ordinarily will be in the range of from about 0.1 to about 4 moles of phenolic stabilizer per mole of azo dye. Molar ratios of less than about 0.1:1 are generally insufficient to provide a desired degree of stabilization for most purposes, and little or no further improvement in dye stability is ordinarily obtained when molar ratios of greater than 4:1 are employed. Preferred ratios are in the range of from about 0.5:1 to about 3:1 and most preferably from about 0.8:1 to about 2.5:1. The hintered phenol can be admixed with the dye to be stabilized or, as in the case of diazotype reproduction media, can be admixed with the benzene diazonium salt and coupler prior to a dye-forming reaction. In the latter instance, the above-mentioned ratios are based upon the amount of dye theoretically formed on development. However, because couplers are normally employed in molar excess over the benzene diazonium salt to ensure complete conversion of the salt to the dye, the ratios may be conveniently based upon the salt itself.

Typical matrix polymers (binder) which can also form part of the coating solution are polymers which exhibit suitable permeability to the alkaline processing media, especially ammonia used in diazotype reproduction and include, for example, such polymers as cellulose esters like cellulose acetate, cellulose butyrate and cellulose acetate butyrate, and also vinyl polymers like poly (vinyl acetate), poly (vinylidene chloride and poly(vinyl butyral). Another typical polymer is poly 4,4'-isopropylidene-diphenyl-2-hydroxy-1,3-propylene ether. Similarly, in the total matrix, the concenrtation of the dye-forming components, i.e., the benzene diazonium salt and coupler, is widely variable although binder (cellulose ester or polymer)—diazo salt ratios of 0–6:1 are normally used. A ratio of about 3:1 appears exceptionally valuable. In the case of the 0:1 ratio there is no binder at all and the chemicals in the solution are imbibed into, e.g., cellulose ester sheeting or into a surface coating previously applied to, e.g., poly(ethylene terephthalate).

In addition to the dye-forming components and dye stabilizers, the polymeric matric may also contain other additives to modify the properties of the final product, such as ultra-violet absorbers, acid stabilizers and the like. A preferred class of additives comprises the known acid stabilizers which prevent premature coupling of the azo salt and the coupler. These acid stabilizers include organic acids such as 5-sulfosalicylic acid and the like. The organic acids are employed in a stabilizer-diazo salt weight ratio amount normally varying from about 1:1–10 usually about 1:5. The amount of stabilizer desirable does, however, vary with, e.g., the molecular weight of the diazo salt, etc. Thus, in specific situations wider variations are possible. Other typical additives are metal salts, such as zinc chloride, which are used as dye brighteners or development accelerators. The metal salts are normally present in an amount varying from about 0.5 to about 2 parts, and preferably from about 1 to about 1.5 parts, by weight per 100 parts of matrix polymer.

Dye-forming components, dye stabilizers, dye brighteners and other additives, when employed, are dispersed in the matrix polymer by any convenient technique, preferably by admixing all components in a common solvent system comprises a mixture of a halogenated aliphtaic hydrocarbon, especially ethylene chloride, and an alkanol, especially ethanol. The order of addition of the ingredients can be varied, although it is preferred that acid stabilizers be added to the solution prior to the diazonium salts. Similarly, the amount of solvent is variable, although it is preferred that the resulting solution contain from about 5 to about 15 weight percent solids, and preferably from about 8 to about 12 percent solids.

The resulting solution is then coated in accordance with generally known techniques. Although not essential, it is preferred that the film be cast on a suitable transparent or opaque support material such as cellulose acetate, polyethylene terephthalate, polystyrene, or paper, preferably coated with one of the above materials or suitably subbed with, for example, barium sulfate and the like. The solution is applied to the support at a rate sufficient to provide an optical density, when developed, of between .8 and 3, with densities typically ranging from 1 to 2. The resulting product can be exposed and developed in any conventional manner, typically in alkaline media such as an ammonia atmosphere, to produce a stabilized azo dye image.

Several different metal types that are most commonly used in equipment for diazonium salt solutions for coating, etc. when tested with diazo salt soltuions in the absence of corrosion inhibitors show etching, pitting, and other signs of corrosion in a few hours. Similar results are obtained with diazonium salt solutions containing previously known corrosion inhibitors. The corrosion is even more significant when such metals are contacted by similar solutions of stabilized diazonium salts. However, when metals are tested with otherwise identical solutions containing small amounts of propylene oxide and/or nitrite, little or no corrosion appears in tests of up to 100 hours at room temperature.

Although several such metals are advantageously protected from corrosion by the incorporation of propylene oxide and/or nitrite, stainless steels, especially types 302, 304, and 316 (American Iron and Steel Institute Standards), are protected to such a degree that corrosion is nearly eliminated. The corrosion of these metals is eliminated almost beyond detection when about 0.001% to 0.2% by weight propylene oxide and .001% to 0.1% by weight sodium nitrite are incorporated in coating solutions of stabilized diazonium compounds.

The following examples illustrates especially valuable embodiments of the subject invention. In the examples, all parts are by weight.

EXAMPLE 1

A diazo salt solution is prepared by adding 65.0 parts of cellulose acetate to a solution of 568.4 parts of 1,2-dichloroethane and 189.5 parts of ethanol, followed by 2.2 parts of 5-sulfosalicylic acid. To the resulting solution there is added 6.8 parts of 4-(diethylamino)benzene diazonium chlorozincate, 3.8 parts of 3-hydroxy-(2,4-dimethoxy-5-chlorophenyl)-2-naphthamide, 2.9 parts of 1-hydroxy-2-naphthoylpiperidide and 2.5 parts of 1-hexadecyl-2-(2,6-diethylphenylamino) - 4 - (2 - methoxy - benzylidene)-5-thiazolidone to provide a solution containing about 10% solids and having a density of 1.15. Test metals including types 302 and 316 stainless steels exhibit definite corrosion when in contact with this solution after periods as short as two to four hours. The solution is coated on subbed 4 mil poly(ethylene terephthalate) support at a rate sufficient to provide a density of about 1.6. The resulting photographic element is cured at 75° C. for two minutes. After exposure to an image and development by subsequent processing with aqueous ammonia vapors, the developed element bearing an azo dye image shows reasonable stability to prolonged exposure.

EXAMPLE 2

The procedure according to Example 1 is followed except that 0.8 part of 1,2-propylene oxide is incorporated into the solution. Little corrosion appears when this solution contacts test metals including types 302 and 316 stainless steels for periods of 50 hours and longer.

EXAMPLE 3

The procedure according to Example 1 is followed except that 0.6 part sodium nitrite is incorporated into the solution. Little corrosion appears when this solution contacts test metals including types 302 and 316 stainless steels for periods of 50 hours and longer.

EXAMPLE 4

The procedure according to Example 1 is followed except that 0.8 part of 1,2-propylene oxide and 0.6 part sodium nitrite are incorporated into the solution. Little corrosion appears when this solution contacts test metals including types 302 and 316 stainless steels for periods of 50 hours and longer.

EXAMPLE 5

A diazo solution is prepared by adding 8.9 parts of cellulose acetate-butyrate to a solution of 55.8 parts of acetone, 21.5 parts of methyl alcohol and 8.6 parts of 2-methoxyethanol followed by 0.5 part of 5-sulfosalicylic acid. To the resulting solution there is added 2.3 parts of 4 - diazo-2,5-diethoxy-1-morpholinobenzene borofluoride, 1.4 parts of 2'-methoxy-3-hydroxy-2-naphthanilide, 0.9 part of 1-hydroxy-2-naphtholpiperidide, 0.025 part of sodium nitrite and 0.050 part of 1,2-propylene oxide. The solution is coated on subbed 4 mil poly(ethylene terephthalate) support at a rate sufficient to provide a developed density of about 1.7. No corrosive effects are observed on stainless steel types 17–4, 304, and 316 after the steels have been in contact with the solution for up to 50 hours.

EXAMPLE 6

The procedure according to Example 5 is followed except that the 0.025 part of sodium nitrite and 0.050 part of 1,2-propylene oxide are omitted. Significant corrosive effects are observed as pitting of stainless steel types 17–4, 304, and 316 upon exposure to the solution for periods as short as two hours.

EXAMPLE 7

A diazo solution is prepared by heating a solution containing 44.5 parts of acetone, 13.4 parts of methyl alcohol, 8.9 parts of 2-methoxyethanol and 22.3 parts of tetrahydrofuran to 130 F. to 150 F. To the resulting solution there is added 1.0 part of 4'-chloro-3-hydroxy-2-naphthanilide. The resulting solution is cooled to 80 F. to 100 F. To the resulting solution there is added 0.3 part of 5-sulfosalicylic acid, 1.2 parts of 4-diazo-2,5-diethoxy-1-morpholinobenzene borofluoride, 0.3 part of 1-diazo-4-diethylaminobenzene borofluoride, 0.5 part of 1-hydroxy-2-naphtholpiperidide, 0.5 part of 2,2'-methylene-bis(4-methyl-6-(1-methylcyclohexyl)phenol), 0.025 part of sodium nitrite, 0.050 part of 1,2-propylene oxide and 7.0 parts of cellulose acetate butyrate in this respective order. The solution is coated on subbed 4 mil poly(ethylene terephthalate) support at a rate sufficient to provide a developed density of about 1.7. No corrosive effects are observed when the solution contacts stainless steel types 17–4, 304, and 316 for periods as long as 50 hours.

EXAMPLE 8

A diazo solution is prepared by heating a solution containing 49.0 parts of acetone, 17.8 parts of methyl alcohol and 22.3 parts of tetrahydrofuran to 130 F. to 150 F. To the resulting solution there is added 1.1 parts of 4'-chloro-3-hydroxy-2-naphthanilide. The resulting solution is cooled to 100 F. to 80 F. To the resulting solution there is added 0.4 part of 5-sulfosalicylic acid, 1.7 parts of 4-diazo-2,5-diethoxy - 1 - morpholinobenzene borofluoride, 0.6 part of 1-hydroxy-2-naphtholpiperidide, 0.025 part of sodium nitrite, 0.05 part of 1,2-propylene oxide and 7.0 part of cellulose acetate-butyrate in this respective order. The solution is coated on subbed 4 mil poly(ethylene terephthalate) support.

EXAMPLE 9

A diazo solution is prepared by adding 7.0 parts of cellulose acetate-butyrate to a solution of 57.9 parts of acetone, 22.3 parts of methyl alcohol and 8.8 parts of 2-methoxyethanol followed by 0.4 part of 5-sulfosalicylic acid. To the resulting solution there is added 1.7 parts of 4 - diazo-2,5-diethoxy-1-morpholinobenzene borofluoride, 1.3 parts of 2',4'-dimethoxy-5'-chloro-3-hydroxy-2-naphthanilide, 0.5 part of 2-acetimido-5-methyl phenol, 0.025 part of sodium nitrite and 0.050 part of 1,2-propylene oxide. The solution is coated on subbed 4 mil poly(ethylene terephthalate) support at a rate sufficient to provide a developed density of about 1.8. No corrosive effects are observed when the solution is used in coating and mixing equipment made from stainless steel types 17–4, 304, and 316.

EXAMPLE 10

The procedure according to Example 9 is followed except that the 0.025 part of sodium nitrite and 0.050 part of 1,2-propylene oxide are omitted. Significant corrosive effects are observed as pitting of the coating and mixing equipment made from stainless steel types 17–4, 304, and 316 when this solution remains in contact with the equipment for periods as short as two hours.

EXAMPLE 11

A diazo solution is prepared by heating a solution containing 49.0 parts of acetone, 17.8 parts of methyl alcohol and 22.3 parts of tetrahydrofuran to 130 F. to 150 F. To the resulting solution there is added 1.0 part of 4'-chloro-3-hydroxy-2-naphthalide. The resulting solution cooled to 100F. to 80 F. To the resulting solution there is added 0.4 part of 5-sulfosalicylic acid, 1.9 parts of 4-diazo-2,5-diethoxy-1-morpholinobenzene borofluoride, 0.5 part of 2-acetimido-5-methyl phenol, 0.025 part sodium nitrite, 0.050 part 1,2-propylene oxide and 7.0 parts of cellulose acetate-butyrate in this respective order. The solution is coated on subbed 4 mil poly(ethylene terephthalate) support at a rate sufficient to provide a developed density of about 1.8. No corrosive effects are observed after extended use of coating and mixing equipment made from stainless steel types 17–4, 304, and 316 with this solution.

EXAMPLE 12

A diazo solution is prepared by heating a solution containing 44.6 parts of acetone, 13.4 parts of methyl alcohol, 8.9 parts of 2-methoxyethanol and 22.3 parts of tetrahydrofuran to 130 F. to 150 F. To the resulting solution there is added 1.1 parts of 4'-chloro-3-hydroxy-2-naphthanilide. The resulting solution is cooled to 100 F. to 80 F. To the resulting solution there is added 0.3 part of 5-sulfosalicylic acid, 1.3 parts of 4-diazo-2, 5-diethoxy-1-morpholinobenzene borofluoride, 0.2 part of 1-diazo-4-diethylaminobenzene borofluoride, 0.3 part of 2-acetamido-5-methylphenol, 0.4 part of 2,2'-methylenebis(4-methyl-6-(1-methylcyclohexyl)-phenol), 0.025 part of sodium nitrite, 0.050 part of 1,2-propylene oxide and 7.0 parts of cellulose acetatebutyrate in this respective order. The solution is coated on subbed 4 mil poly(ethylene terephthalate) support at a rate sufficient to provide a developed density of about 1.8. No corrosive effects are observed on the coating and mixing equipment, both being made from stainless steels containing types 17–4, 304, and 316 stainless steels.

The procedure according to the examples when carried out using (a) from about .001% to about 0.2% by weight propylene oxide and/or (b) .0005% to about 0.1% by weight nitrite based on the total weight of the solution, similiarly show a remarkably reduced tendency to corrode metals. The same is true when the previously disclosed binders, coupling agents, and diazonium salts, etc. are substituted for those employed in the examples. The decreased corrosion tendency is especially significant in diazo systems disclosed in copending U.S. application Ser. No. 657,077 entitled Two-Component Diazo Type Composition filed July 31, 1967, by William Gray, now U.S. Pat. 3,573,051 issued Mar. 30, 1971, the disclosure of which is incorporated herein by reference. For example, solutions containing (a) as the diazo component, a 2,5-dialkoxy-4-morpholinobenzene diazonium salt and optionally a 4-(dialkylamino)benzene diazonium salt; (b) as a blue coupler, at least one of a 2-hydroxy-N-(2-alkylphenyl)-3-naphthamide and a 2-hydroxy-N-(2,4-dialkoxy-5-halophenyl)-3-naphthamide; and (c) as a yellow coupler, an N-substituted or an N,N-di-substituted 1-hydroxy-2-naphthamide or a 2-acylamido-5-alkylphenol are rendered non-corrosive by the incorporation therein of the indicated amount of nitrite or propylene oxide.

The invention has been described in detail with particular reference to preferred embodiments thereof, but it will be understood that variation and modifications can be effected within the spirit and scope of the invention.

We claim:

1. A diazonium salt solution comprising at least one diazonium salt and a member selected from the group consisting of:
   (A) from about 0.001 to about 1.0 percent by weight based on the total weight of said solution of 1,2-propylene oxide; and
   (B) from about 0.001 to about 1.0 percent by weight based on the total weight of said solution of 1,2-propylene oxide and from about 0.0005 to about 1.0 percent by weight based on the total weight of said solution of sodium nitrite.

2. A diazonium salt solution as in claim 1 wherein the selected member is (A).

3. A diazonium salt solution as in claim 1 wherein the selected member is (B).

4. A diazonium salt solution as in claim 1 comprising a stabilized diazonium salt selected from the group consisting of diazonium chlorozincates and fluoroborates, said solution further including at least one 2-hydroxy-3-naphthoanilide blue coupler, a fade-inhibiting sterically hindered phenolic compound and at least one 2-acylamido-5-substituted phenol yellow coupler.

5. A method for inhibiting the corrosion of stainless steel metals generally subject to corrosion when contacted with diazonium salt solutions comprising the step of contacting said metal with a diazonium salt solution containing a member selected from the group consisting of:
   (A) from about 0.001 to about 1.0 percent by weight based on the total weight of said solution of 1,2-propylene oxide; and
   (B) from about 0.001 to about 1.0 percent by weight based on the total weight of said solution of 1,2-propylene oxide and from about 0.0005 to about 1.0 percent by weight based on the total weight of said solution of sodium nitrite.

6. The method of claim 1 wherein from about 0.001 to about 1.0 percent by weight of 1,2-propylene oxide is incorporated in the diazonium salt solution as the selected member.

7. The method of claim 1 wherein from about 0.001 to about 0.2 percent by weight of 1,2-propylene oxide and about 0.001 to about 1.0 percent by weight of sodium nitrite is incorporated in the diazonium salt solution as the selected member.

References Cited

UNITED STATES PATENTS

| | | | |
|---|---|---|---|
| 2,990,281 | 6/1961 | Printy et al. | 96—91 X |
| 2,872,282 | 2/1959 | Englund | 21—2.7 |
| 2,552,084 | 5/1951 | Bishop et al. | 252—396 X |
| 2,566,926 | 9/1951 | Burghart | 252—396 X |
| 3,304,267 | 2/1967 | Miller | 21—2.7 X |
| 2,371,645 | 3/1945 | Aitchison et al. | 134—31 |
| 2,531,829 | 11/1950 | Seymour | 252—396 X |
| 2,405,523 | 8/1946 | Sease et al. | 96—91 X |
| 2,807,545 | 9/1957 | Frederick | 96—75 |
| 2,523,863 | 9/1950 | Cook et al. | 252—396 X |
| 3,573,051 | 3/1971 | Gray | 96—91 |

FOREIGN PATENTS

| | | | |
|---|---|---|---|
| 1,805,891 | 5/1969 | Germany | 96—91 |

CHARLES L. BOWERS, JR., Primary Examiner

U.S. Cl. X.R.

96—75; 21—2.5; 252—389, 396, 400, 403